(12) United States Patent
Nehrig et al.

(10) Patent No.: US 8,886,123 B2
(45) Date of Patent: Nov. 11, 2014

(54) POWER LEVEL INDICATOR

(75) Inventors: Oliver Nehrig, Kirchdorf (DE); Carlo Peschke, Freising (DE)

(73) Assignee: Texas Instruments Deutschland GmbH, Freising (DE)

( * ) Notice: Subject to any disclaimer, the term of this patent is extended or adjusted under 35 U.S.C. 154(b) by 1080 days.

(21) Appl. No.: 12/722,391

(22) Filed: Mar. 11, 2010

(65) Prior Publication Data

US 2010/0253315 A1 Oct. 7, 2010

(30) Foreign Application Priority Data

Mar. 20, 2009 (DE) .......................... 10 2009 013 962

(51) Int. Cl.
*H04B 7/00* (2006.01)
*H02J 17/00* (2006.01)
(52) U.S. Cl.
CPC ....................................... *H02J 17/00* (2013.01)
USPC .............................. 455/41.2; 455/73; 323/315
(58) Field of Classification Search
CPC ....................................................... H02J 17/00
USPC ................................... 455/41.2, 73; 323/315
See application file for complete search history.

(56) References Cited

U.S. PATENT DOCUMENTS

| 6,639,459 B1* | 10/2003 | Devilbiss ....................... 329/341 |
| 2005/0122651 A1* | 6/2005 | Fischer et al. .................. 361/90 |
| 2008/0068100 A1* | 3/2008 | Goodnow et al. ................ 331/57 |
| 2008/0311861 A1* | 12/2008 | Lepek ............................ 455/73 |

FOREIGN PATENT DOCUMENTS

| DE | 60308113 T2 | 2/2004 |
| DE | 103056259 | 7/2005 |
| DE | 102007027610 | 12/2008 |

OTHER PUBLICATIONS

DE Search Report, Feb. 10, 2010.

* cited by examiner

*Primary Examiner* — Hsin-Chun Liao
(74) *Attorney, Agent, or Firm* — William B. Kempler; Frederick J. Telecky, Jr.

(57) ABSTRACT

An electronic device is provided that is adapted to generate a supply voltage at an input node from a radio frequency (RF) signal. The electronic device includes a limiter coupled to the input node for limiting a supply voltage level at the input node that is generated by the received RF signal. The limiter is configured to draw a limiter current from the input node so as to limit the supply voltage level to a maximum and a magnitude of the limiter current is used for controlling a power consumption of the electronic device.

9 Claims, 2 Drawing Sheets

POWER LEVEL INDICATOR

CROSS-REFERENCE TO RELATED APPLICATIONS

This patent application claims priority from German Patent Application No. 10 2009 013 962.1, filed Mar. 20, 2009, the entirety which is incorporated herein by reference.

FIELD OF THE INVENTION

The present invention relates to a method and an electronic device with a mechanism for indicating a power level of an available amount of power.

BACKGROUND OF THE INVENTION

There is a ubiquitous need to improve power management of mobile electronic devices, as for example RFID transponders. A simplified circuit and block diagram of a conventional RFID device is shown in FIG. 1. The RFID device can be supplied through a received RF signal (electromagnetic waves, electromagnetic field). Therefore, the RFID device 10 includes a resonance circuit 4 with a resonant inductor LR (may serve as antenna) and resonant capacitor CR. The resonant circuit is excited through an external RF signal to oscillate with an oscillation frequency. Due to this oscillation, an oscillating voltage develops on input nodes VANT1 and VANT2. A limiter 6 is coupled to resonance circuit 4. The limiter 6 includes a limiter control stage 1, which provides a limiter control signal SLC to transistors M5 and M6. The transistors M5 and M6 are coupled with their channels in series between nodes VANT1 and VANT2. Transistors M5, M6 represent a variable load to nodes VANT1 and VANT2. If the voltage at node VANT1 (between VANT1 and VANT2) exceeds a predetermined maximum voltage level, limiter control stage 1 issues a control signal SLC to the control gates of M5, M6 in order to increase the load to node VANT1 (and VANT2). The respective limiter current IL through M5 and M6 increases in order to decrease the voltage at node VANT1. When the voltage at input VANT1 (VANT2) drops, current IL is reduced. This is the basic functionality of a limiter 6. The limited supply voltage at nodes VANT1, VANT2 is fed to a rectifier stage 2 for rectifying the alternating (oscillating) voltages VANT1, VANT2. Rectifier stage 2 provides a rectified supply voltage level VDDH. The rectified supply voltage VDDH is passed through a voltage regulator 3, which generates the regulated output voltage VDD. VDD is used for all internal electronic components, as for example a processing unit (microcontroller), digital logic, or various different analogue or digital parts of the RFID device. These remaining components are represented by stage SYSTEM 5. If the power consumption of SYSTEM 5 exceeds the maximum available power, this can cause a sudden drop of the antenna voltage and a sudden shutdown of the RFID device may occur. This can cause errors and failure.

SUMMARY OF THE INVENTION

It is an object of the invention to provide an electronic device with an improved control mechanism that is less sensitive to power variations and provides an improved power management.

An electronic device (e.g. an RFID device as a transponder) is provided that can be powered by a received radio frequency (RF) signal. The electronic device includes a limiter coupled to an input node for limiting a supply voltage level at the input node. The supply voltage is induced by the received RF signal. The limiter is configured to provide a controlled and variable load to the input node for limiting the maximum voltage at the input node. By controlling the load, the limiter draws a limiter current from the input node for limiting the voltage level. A magnitude of the limiter current is then used for controlling a power consumption of the electronic device. Accordingly, the electronic device is adapted to use and evaluate the magnitude of the limiter current as an indicator for the available power. A power control stage may be provided and adapted to use the information about the magnitude of the limiter current for controlling the parts and components of the electronic device. This allows the variable power consumption of the electronic device to be correlated or even matched with the available power that is received through the antenna.

The electronic device may be configured to determine an excess power that is available to the electronic device based on the magnitude of the limiter current. The magnitude of the limiter current may not be an exact indicator of the available power, but the amount of power that may be consumed in other parts of the electronic device can be a specific portion of the excess power indicated by the limiter current. This allows a precise prediction of the maximum available power for an electronic device. The electronic device may be configured to control the power consumption based on the magnitude of the limiter current in combination with a magnitude of a current consumed in the electronic device. If the power management of the electronic device not only evaluates the available power, but also considers the predetermined and expected power consumption of internal stages and components of the electronic device, a flexible and efficient power management can be provided.

There may be a buffer (for example a buffer capacitor) for buffering energy, which can be used for supplying the electronic device. The electronic device may then be configured to control the power consumption based on the combination of the limiter current and an amount of energy stored on the buffer.

In an embodiment, the electronic device may be configured to vary the clock frequency of a clock signal of an internal digital stage (e.g. a processor or some logic) for controlling the power consumption with respect to the magnitude of the limiter current, the expected power consumption of the respective stage and/or an energy stored on a buffer. As the power consumption of digital circuits depends on the clock frequency, the power consumption may efficiently be controlled by reducing or increasing the clock frequency. Furthermore, it is possible to adapt the possible operations and the calculation speed to the available power.

The limiter may include a first transistor, which is coupled with a channel to the input node. The first transistor may be the variable load. The transistor may be controlled to draw a limiter current from the input node. Furthermore, there may be a second transistor which is coupled to the first transistor in a current mirror configuration for mirroring the limiter current. The current mirror configuration may be used in order to derive an appropriate signal, which is an indicator for the magnitude of the limiter current.

The invention also provides a method of operating an electronic device. The method may comprise the following steps: A magnitude of a limiter current that is used to limit a voltage level at an input node may be determined. The voltage level at the input node is generated with a received RF signal. Furthermore, a power consumption of the electronic device is controlled based on the magnitude of the limiter current.

BRIEF DESCRIPTION OF THE DRAWINGS

Further characteristics and advantages of the invention ensue from the description below of a preferred embodiment with reference to the accompanying drawings in which.

DETAILED DESCRIPTION OF EXAMPLE EMBODIMENTS

Figure 1:
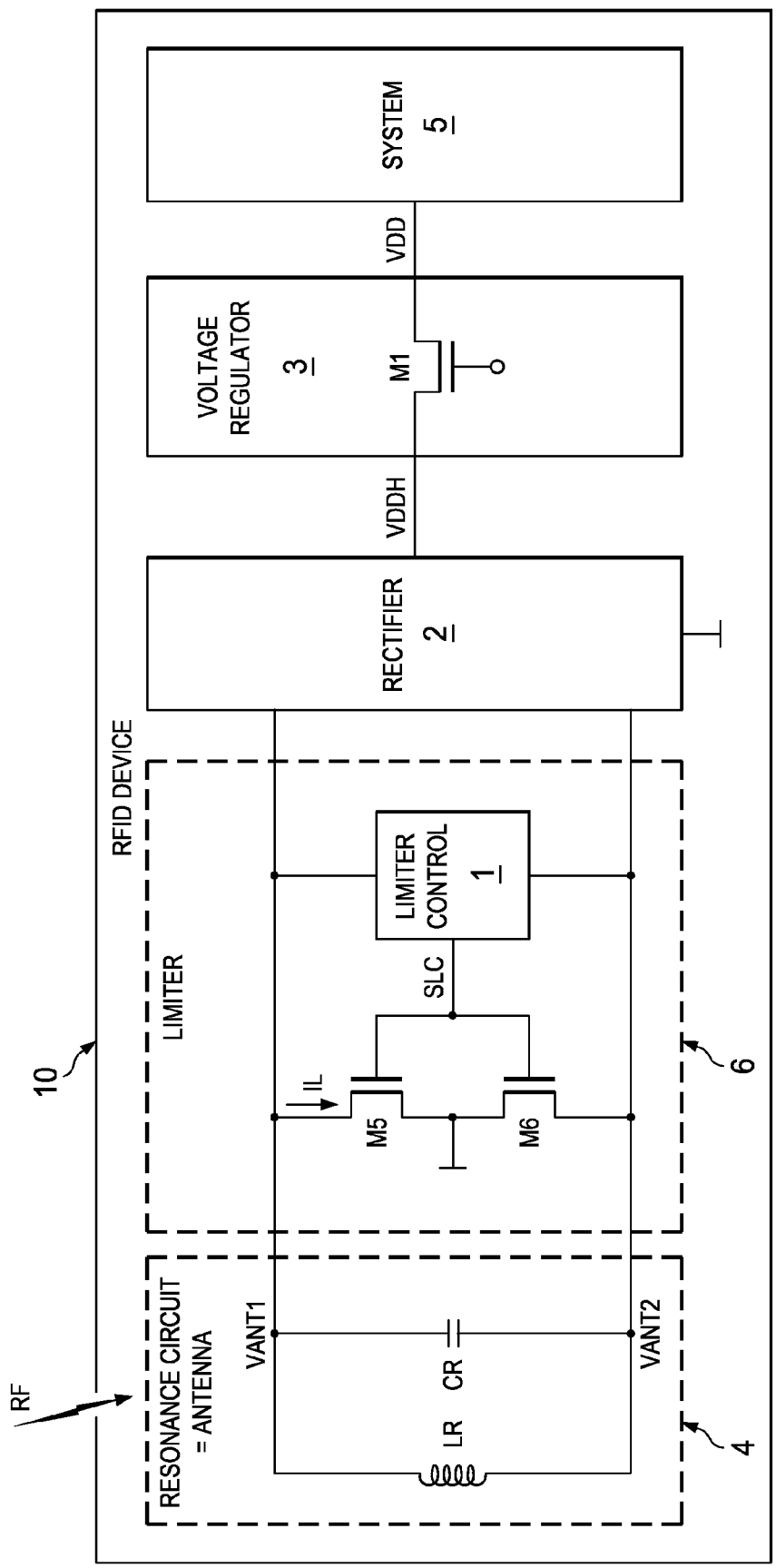
FIG. 1 is simplified circuit and block diagram of a conventional electronic device according to the prior art.
Figure 2:
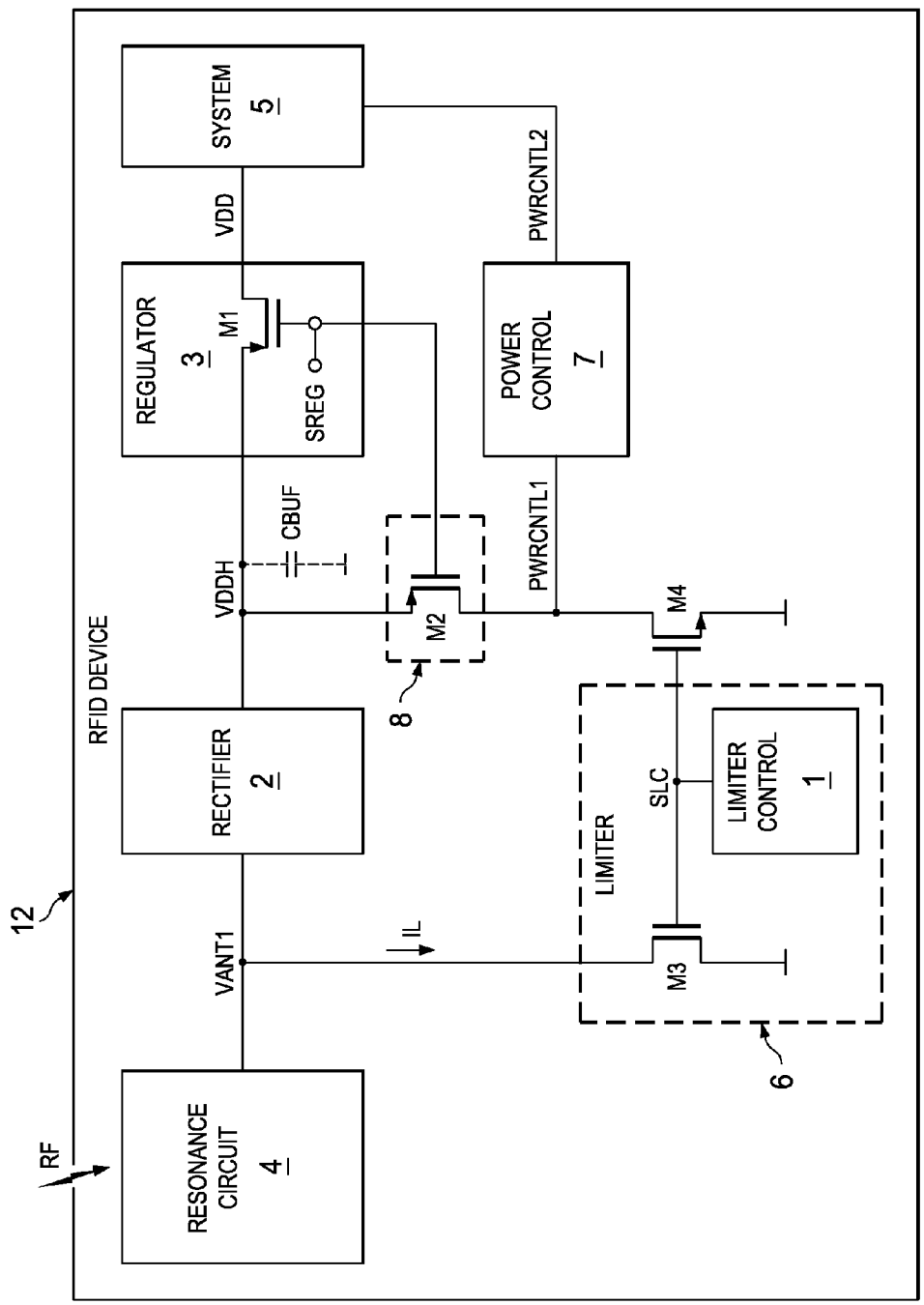
FIG. 2 is a simplified circuit diagram of an electronic device according to an embodiment of the invention.

FIG. 2 shows a simplified circuit (and block) diagram of an electronic device 12 (e.g. a partially integrated electronic device as an RF transponder IC) according to an embodiment of the invention. The basic structure and components of the electronic device 12 are substantially similar to the RFID device 10 shown in FIG. 1. There is a resonant circuit (LR, CR), which may include a resonance inductor LR and a resonance capacitor CR shown in FIG. 1. The resonance circuit 4 is excited with an external RF signal, i.e. it serves as antenna. The incoming RF signal or electronic field induces a voltage at node VANT1. A limiter 6 is coupled to node VANT1. The limiter 6 includes a limiter control stage 1, which provides a limiter control signal SLC to transistor M3. Transistor M3 is coupled with a channel to VANT1 for presenting a variable load to node VANT1. If the voltage at node VANT1 exceeds a maximum limit, limiter control stage 1 controls M3 through limiter control signal SLC to increase the limiter current IL. The respective limited voltage VANT1 is passed through rectifier 2 to provide a rectified internal voltage VDDH. Voltage VDDH is passed through regulator 3 for providing a regulated internal supply voltage VDD. The supply voltage VDDH may be buffered with a buffer capacitor CBUFF. Other components (SYSTEM) 5 of the electronic device 12 may be supplied with the supply voltage VDD. The limiter current IL through transistor M3 is mirrored to transistor M4. The drain of transistor M4 may then be coupled to a voltage supply level or another electronic device, such that the voltage level at the drain can be used as a power control signal PWRCNTL1. This power control signal is an indicator of the magnitude of the current IL. The magnitude of the limiter current IL increases if the received power raises above a maximum voltage level that is defined by the used technology. If the voltage level at VANT1 drops, the magnitude of limiter current IL decreases. Power control stage 7 receives power control signal PWRCNTL1 and provides an internal power control signal PWRCNTL2 to SYSTEM 5. SYSTEM 5 may include digital circuit, which is clocked with a system clock of a specific clock frequency. Power control stage 7 may then control the system clock frequency of SYSTEM 5 in order to reduce or increase power consumption in response to the magnitude of the limiter current. The energy (charge) buffered on buffer capacitor CBUFF may also be considered for the power management. Power control stage 7 may be adapted to determine or calculate power control signal PWRCNTL2 with respect to the energy stored on buffer capacitor CBUFF.

In another embodiment, a transistor M2 may be coupled in series with transistor M4. Furthermore, the source of transistor M2 may be coupled to rectified internal supply voltage VDDH. M2 receives at its gate a control signal SREG from regulator 3, which is also used for controlling transistor M1 which is the power MOSFET for regulating the voltage VDD. In this configuration, transistor M2 serves as an additional power management stage 8. This power management stage 8 has an influence on power control signal PWRCNTL1. Therefore, power control signal PWRCNTL1 provides information about the available excess power and the expected or current power consumption. The ratio of the available excess power and the power consumption consumed power can be used in power control stage 7 for generating a respective power control signal PWRCNTL2 to SYSTEM 5.

The electronic device according to the invention is an RFID device, as for example an RFID transponder. The RFID device may not necessarily be completely battery-less, but a certain amount of power may be received through resonance circuit 4 (the antenna).

The current from the limiter transistor M3 is mirrored out through M4. M3 can operate in saturation. The output current over the regulation transistor M1 can be mirrored with M2 given that M1 is also in saturation. The current mirrors can be simple current mirrors or regulated current mirrors. In an embodiment with an NMOS transistor as series regulator M1, it can be necessary to regulate the drain source voltage of M1 and M2. A simple current mirror may then not be used. Dependent on the transistor ratios, the output provides a "0", if the divided limiters current is higher than the divided output current and "1" if the divided limiter current is lower. The ratio between excessive and consumed power may then be determined through the ratio (aspect ratios with respect to each other) of M1 to M2 and M3 to M4.

In another embodiment, multiple parallel paths equal to the path through M2 and M4 may be implemented. This allows multiple excessive-to-consumed power ratios to be detected. The limiter transistor M3 and the regulator transistor M1 can be chosen rather wide (great channel width) in order to achieve a low voltage drop. Therefore, ratios M1 to M2 and M3 to M4 can be implemented in range of 1 to 100. This can serve to reduce power consumption.

An embodiment of the present invention has been explained above. The present invention, however, is not limited to said embodiment. Various kinds of modifications, substitutions and alterations can be made within the scope of the technical idea of the present invention as defined by the appended claims.

The invention claimed is:

1. An electronic device adapted to generate a supply voltage at an input node from a radio frequency (RF) signal, the electronic device comprising a voltage limiter coupled to the input node for limiting a supply voltage level at the input node that is generated by the received RF signal, wherein the limiter is configured to draw a limiter current from the input node so as to limit the supply voltage level to a maximum and a magnitude of the limiter current is used for controlling a power consumption of the electronic device, wherein the limiter comprises a first transistor coupled with a channel to the input node and the first transistor is controlled to draw the limiter current from the input node and a second transistor coupled to the first transistor in a current mirror configuration for mirroring the limiter current, further comprising a voltage regulator having a third transistor for regulating voltage to the electronic device and a fourth transistor in series with the second transistor coupled to an input for the voltage regulator and having a control electrode coupled to the control electrode of the third transistor, a voltage at a node between the second and fourth transistors being used to control power consumption of the electronic device.

2. The electronic device according to claim 1, being further configured to determine an amount of excess power that is available to the electronic device, based on the magnitude of the limiter current.

3. The electronic device according to claim 1, being configured to control the power consumption based on the magnitude of the limiter current and a power consumption in the electronic device.

4. The electronic device according to claim 3, further comprising a buffer for buffering energy to be used for supplying the electronic device, wherein the electronic device is further configured to control the power consumption based on a combination of the limiter current and energy stored on the buffer.

5. The electronic device according to claim 4, being configured to vary the clock frequency of a clock signal so as to control the power consumption.

6. A method of operating an electronic device, the method comprising: determining a magnitude of a voltage limiter current that is used to limit a voltage level at an input node, which is generated with a received RF signal, mirroring the magnitude of the limiter current, passing the mirrored current through a transistor which has a control electrode coupled to a control electrode of a voltage regulator circuit for regulating voltage to the electronic device, utilizing a signal had a node between the current mirror in the transistor for generating a signal for controlling a power consumption of the electronic device based on mirrored magnitude of the limiter current by varying the clock frequency of a clock signal so as to control the power consumption.

7. The method according to claim 6, further comprising determining an amount of excess power that is available to the electronic device, based on the magnitude of the limiter current.

8. The method according to claim 6, further comprising controlling the power consumption based on the magnitude of the limiter current and a power consumption in the electronic device.

9. The method according to claim 6, further comprising buffering energy to be used for supplying the electronic device, wherein the electronic device controls the power consumption based on a combination of the limiter current and energy stored on the buffer.

* * * * *